Feb. 28, 1961  A. J. SACKETT, JR  2,973,191
DRYER FOR FERTILIZER AND THE LIKE
Filed March 6, 1956  5 Sheets-Sheet 1
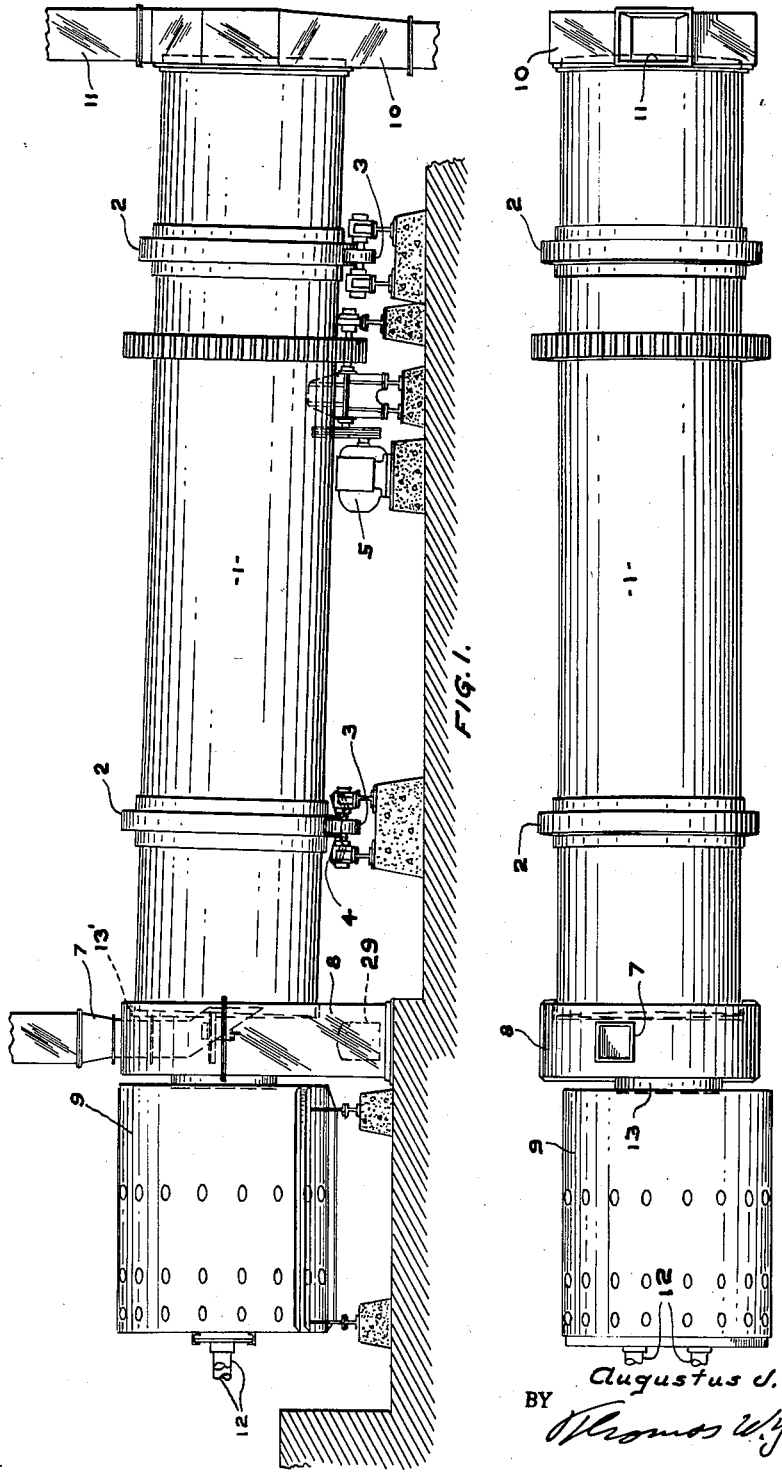
INVENTOR
Augustus J. Sackett Jr
BY Thomas W. J. Clark
ATTORNEY

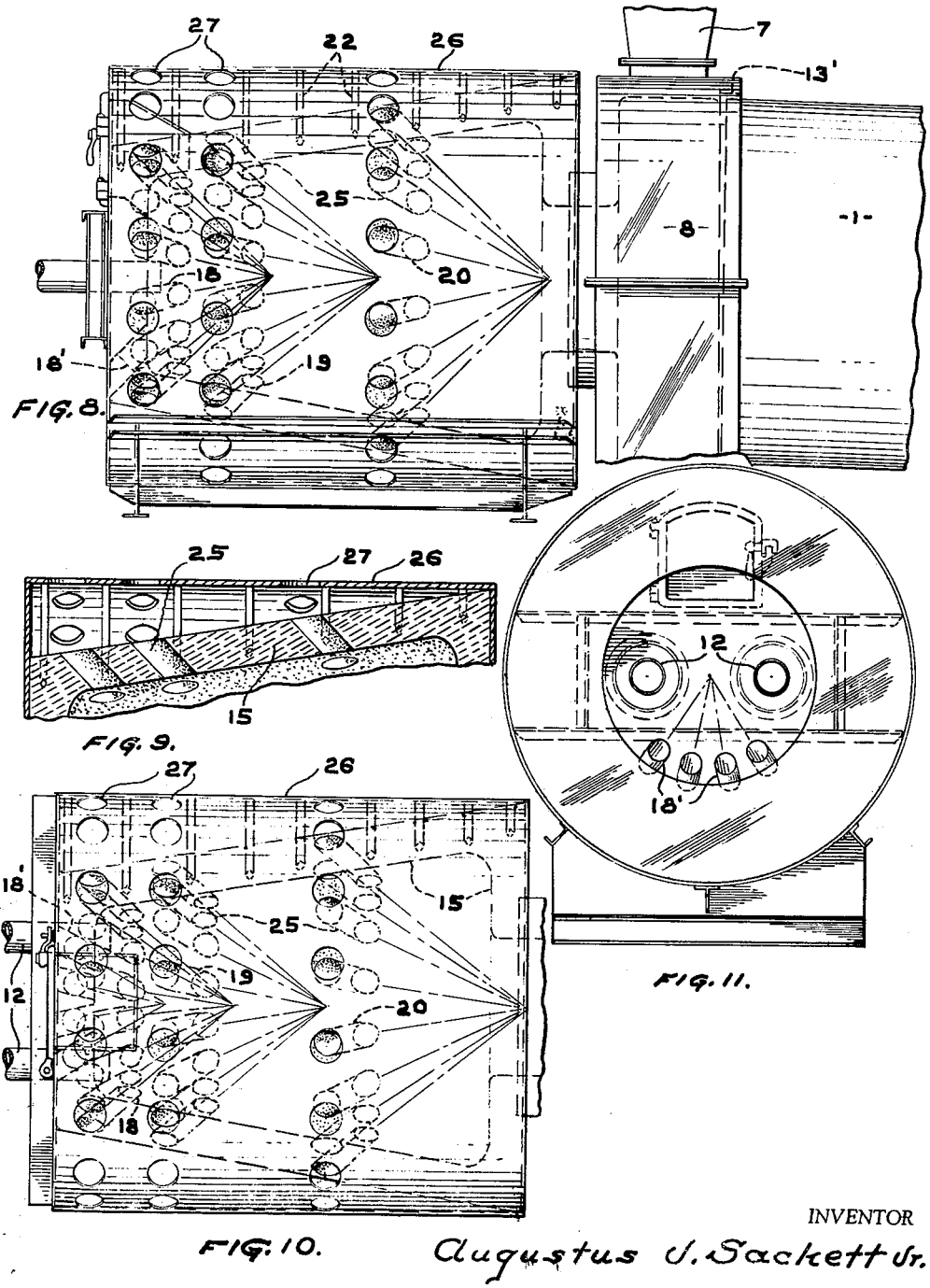

Feb. 28, 1961

A. J. SACKETT, JR 2,973,191

DRYER FOR FERTILIZER AND THE LIKE

Filed March 6, 1956

INVENTOR
Augustus J. Sackett Jr.

BY Thomas W. Y. Clark

ATTORNEY

Feb. 28, 1961     A. J. SACKETT, JR     2,973,191
DRYER FOR FERTILIZER AND THE LIKE
Filed March 6, 1956     5 Sheets-Sheet 4
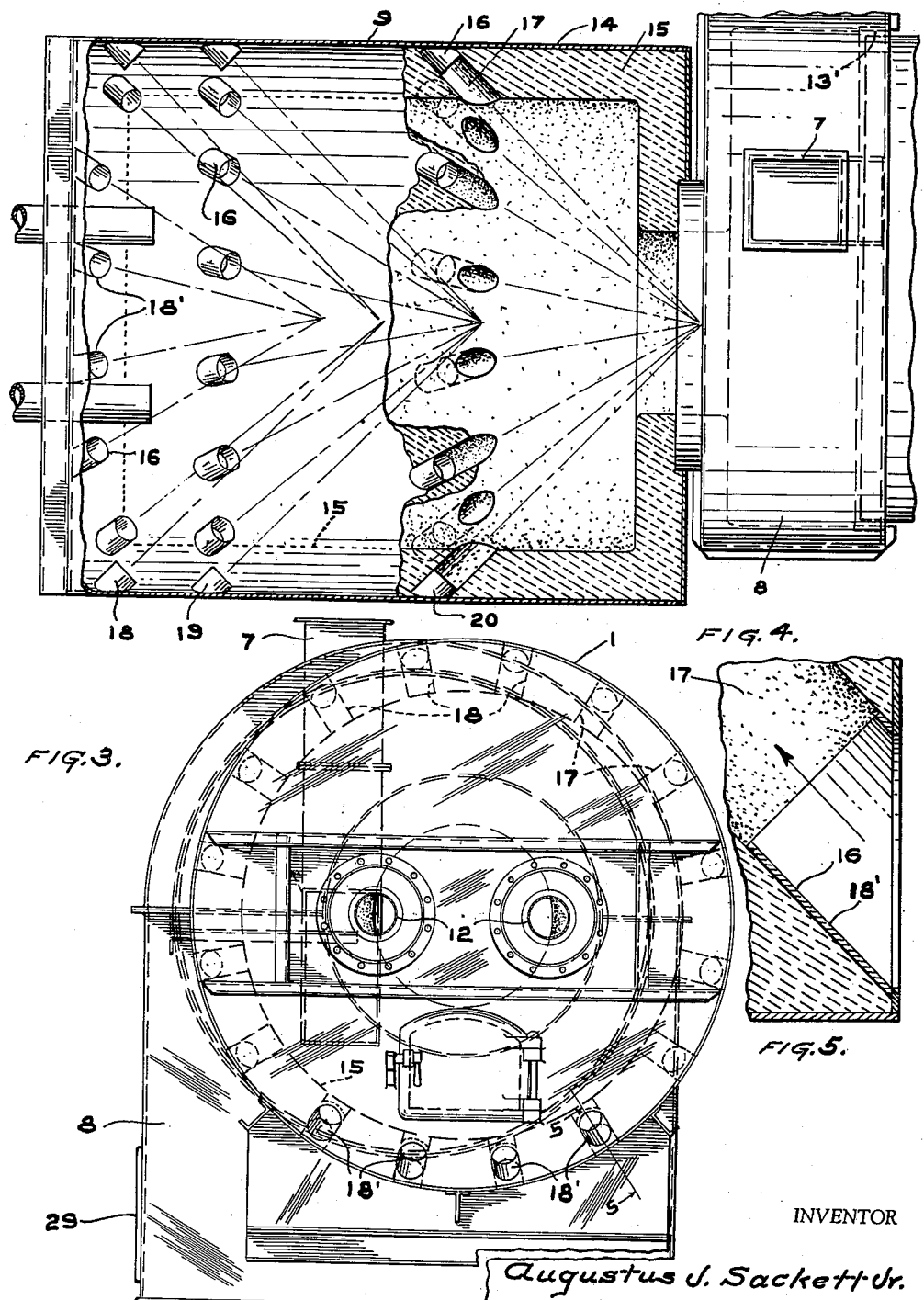
INVENTOR
Augustus J. Sackett Jr.
BY
ATTORNEY Feb. 28, 1961  A. J. SACKETT, JR  2,973,191
DRYER FOR FERTILIZER AND THE LIKE
Filed March 6, 1956  5 Sheets-Sheet 5
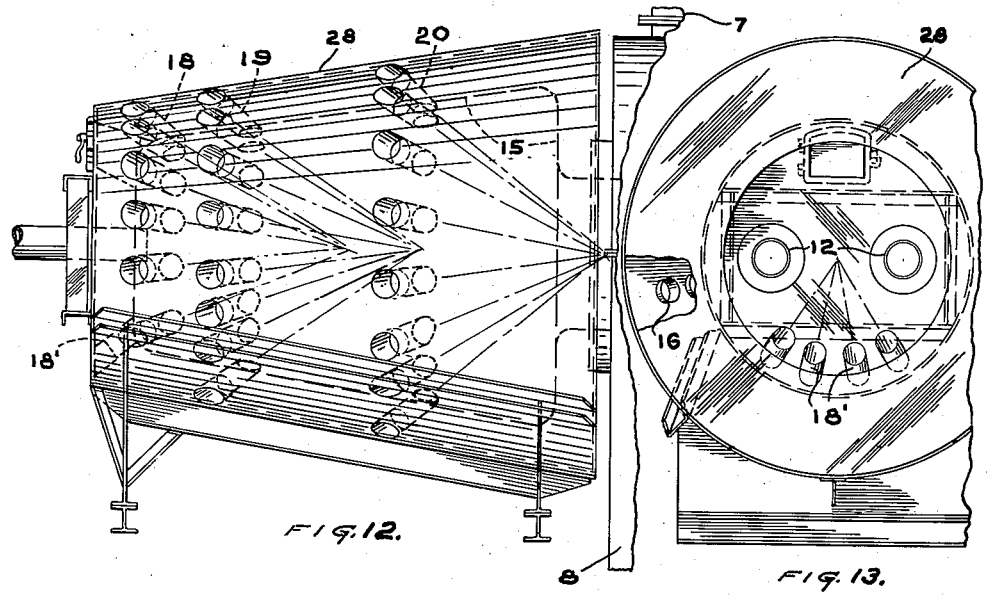
FIG. 12.
FIG. 13.
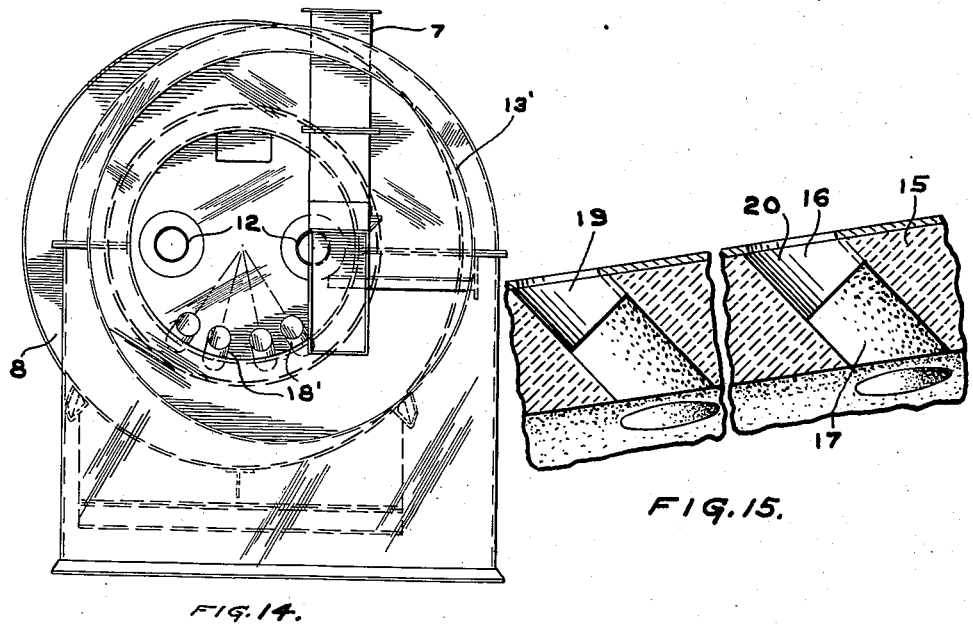
FIG. 14.
FIG. 15.
INVENTOR
Augustus J. Sackett Jr.
BY
ATTORNEY United States Patent Office 2,973,191
Patented Feb. 28, 1961

2,973,191

DRYER FOR FERTILIZER AND THE LIKE

Augustus J. Sackett, Jr., Baltimore, Md., assignor to The A. J. Sackett & Sons Company, Baltimore, Md., a corporation of Maryland Filed Mar. 6, 1956, Ser. No. 569,871

3 Claims. (Cl. 263—33)

This invention relates to a dryer and burner for drying fertilizer and other materials.

Heretofore in the drying of fertilizer and other materials the furnace has been connected to the dryer and the material to be dried has been introduced to the dryer between the furnace and dryer and the hot air passed from the furnace to the dryer through a passage. The dryer has been of the rotary type, slightly sloped so that upon the rotation of the dryer the material will tumble around and gradually pass from one end to the other. Flights have been placed in the dryer to slightly lift the material to further exposure of the hot air passed through the furnace. Heretofore the air has been admitted to the furnace, there usually being a draft upon the exit end of the dryer, closely adjacent to the fuel burner pipes leading into the furnace so that the air was picked up by the flame very close to the burner. The introduction of more air has at times been found to draw the flame from the burner and thereby extinguish the flame.

The principal object of the present invention is to promote the drying at a lower temperature than has previously been used and this is done primarily by admitting a larger quantity of air to the furnace and that air has been introduced in a manner to avoid drawing the flame from the burner. One of the principal reasons that it is desirable to use low drying temperatures is to avoid driving off the low volatile constituents of the material, such as the ammonia in fertilizer. It has also been found in the practice of this invention that the fire brick or refractory material constituting the furnace wall will be heated to a much lower temperature because of the use of the large quantity of air and the method of introducing the air to cool the fire brick or refractory.

In this invention the air is preferably introduced circumferentially of the furnace and it is directed in such a manner as to focus it at a point within the path of the flame, but spaced well from the burner toward the dryer so that there is no tendency for the flame to leave the burner. Preferably orifices have opposites to equally distribute the air around the flame. In the preferred embodiment of the invention there are several rows, circumferentially of the burner, of air inlets so that additional quantities of air are introduced to the flame spaced progressively toward the dryer. The final row of inlets with directional means for them introduces a large quantity of air immediately as the heated air leaves the furnace and enters the passage leading to the dryer so that the flame itself does not enter the dryer.

Another object of the invention is to offset the furnace exit from the dryer inlet so that the material inlet chute interferes much less with the introduction of the heated air to the dryer and so that the heated air in its initial entry to the dryer will be on the side of the dryer where the material is initially dropped from the flights on the inside of the dryer in order to obtain the maximum benefit from the heated air early in the progression of material through the dryer. It has likewise been found that when the materials are dried slowly, that they have a much harder surface for the individual granules and the slow drying by initially forming a harder surface upon the pellets avoids the breaking of pellets into smaller sizes as they progress through the drying process. Increasing the strength of the outer surface of the granules of material to avoid their pulverization during their tumbling in the drying process, is another object of the invention. This is accomplished by directing the hottest part of the air upon the incoming granular material as early in the process of tumbling as may be done. It is also accomplished by maintaining the heat relatively low in temperature and at the same time using a large volume of air which carries off the moisture from the drying granules much more gradually than is the case where excessively heated air in smaller quantities is used.

It has actually been found that with the use of lowered temperatures in the furnace the life of the fire brick or refractory material is increased considerably. These furnaces have often been heated and constantly operated at a temperature as high as 1500° F. or more. It has not only been found that superior results in the product may be obtained by the apparatus of the instant invention in which the temperature is maintained at 1000° F. or less, but this greatly lowered temperature of the furnace greatly prolongs the life of the refractory lining of the furnace. In actual practice it takes some time to replace the furnace lining. By increasing the life of that lining the shut down time for the furnace is reduced. Also the volatile parts of the material are largely saved.

The various modifications of the invention show different means for obtaining the desired slow heating of the granular material with a large amount of air and which at the same time greatly prolongs the life of the fire brick or lining for the furnace.

The above and other advantages and objects of the invention will be apparent from the following description and the accompanying drawings forming a part hereof and in which:

Figure 1 is a longitudinal elevational view of a dryer and furnace embodying this invention.

Figure 2 is a top plan view thereof.

Figure 3 is an end elevational view thereof, from the furnace end.

Figure 4 is an enlarged fragmentary top plan view, partly broken away, showing the directional tuyeres.

Figure 5 is a fragmentary sectional view through one of the tuyeres, on line 5—5 of Figure 3.

Figure 8 is a side elevational view of another modification of the furnace.

Figure 9 is an enlarged fragmentary sectional view of the furnace shown in Figure 8.

Figure 10 is a top plan view of the furnace shown in Figure 8.

Figure 11 is an end elevational view thereof.

Figure 12 is a side elevational view of another modification of the furnace.

Figure 13 is an end elevational view of the furnace of Figure 12 from the right with a section broken out and with the refractory lining omitted.

Figure 14 is an end elevational view of the furnace of Figure 12 shown with the passage chamber to the dryer.

Figure 15 is a fragmentary longitudinal sectional view through the wall of the furnace of Figure 12 showing the tuyere construction.

Similar numerals refer to similar parts throughout the several views.

Figure 6:
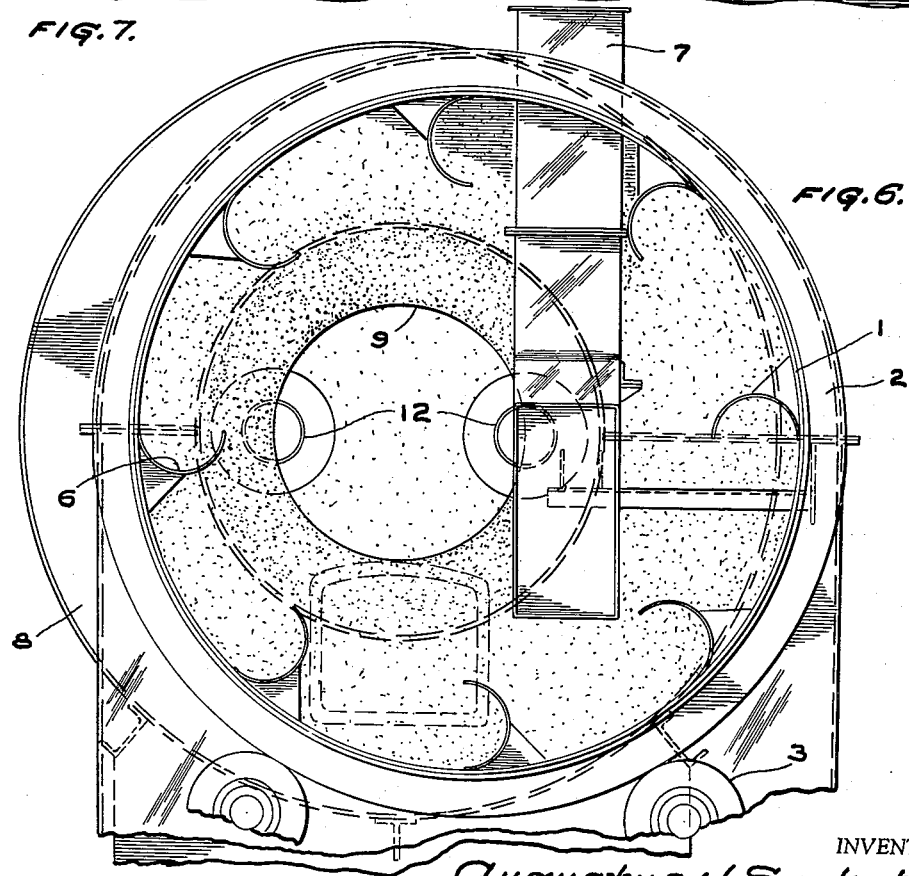
Figure 6 is an end elevational view of the dryer with the discharge casing removed.

The cylindrical dryer 1 is encircled by rings 2 bearing on rollers 3 to support its weight. Additional rollers 4 prevent its longitudinal movement because it is sloped downwardly from the inlet end to the discharge end. It is rotated through motor means and gearing 5. The dryer has flights 6 therein, as shown in Figure 6, to lift the material and drop it from the flights in a cascading movement as the dryer rotates in a clockwise direction in Figure 6. The dryer has an inlet chute 7 in the passage chamber 8 between the dryer 1 and the furnace 9. The dryer also has an exit chute 10 through the top of which 11 is created a draft to draw air through the furnace, where it is heated and then through the dryer where the warm air withdraws the moisture from the material being tumbled in the dryer, after which the material falls through the chute 10 in hard dry granules.

The furnace 9 has inlet pipes 12 for fluid fuel, oil or gas, and preferably a completely combustible mixture is introduced through these two pipes or burners to the furnace.

The furnace has a collar 13 connecting it with the passage chamber 8, and the hot air from the furnace passes through this passage chamber 8 to the rotary dryer 1, from which it is offset as shown in Figures 2 and 6 and the chute 7 enters the passage chamber 8 to one side, away from the central axis of the furnace and this substantially avoids overheating the chute, off-setting the furnace on this side also directs the warmest air from the furnace onto the granular material as it is first dropped from the flights in the dryer, after passing to the dryer from the chute 7. This assures the warmest temperatures to the incoming granules before they have tumbled to any large extent in the dryer to increase the hardness of their surface to retain the volatiles in the granules and so that pulverization of the granules is substantially avoided. The dryer 1 rotates in recess 13' in passage chamber 8.

The furnace 9 has a sheet iron casing 14 lined with fire brick or refractory material 15. The sheet iron casing 14 has welded thereto tubes or sleeves 16 connected and aligned with which are the openings 17 in the refractory material. These openings form tuyeres circumferentially positioned around the furnace in three groups 18, 19 and 20. In both groups 19 and 20 the tuyeres are substantially equally spaced around the body of the furnace. In the group 18 the lowermost tuyeres 18', instead of coming out of the side walls of the furnace, they come out of the rear end of the furnace. This is primarily to avoid any possible stoppage to the passage of air through them. In the preferable construction these three groups of tuyeres each focus at points centrally or axially of the furnace chamber and all the groups of tuyeres are positioned to direct and focus the incoming air at points substantially removed from the burner nozzles. As above stated, in prior practice, the air was admitted substantially parallel to the burners and if it was admitted in any quantity there was a strong tendency for the sweeping air, sweeping past the burner nozzles to draw off the flame so that the burner would be extinguished. When the air is drawn in or directed into the combustion chamber substantially forward of the nozzles and spaced from them then this tendency to extinguish the flame is completely avoided and still a very large quantity of air can be admitted. When the air is admitted in stages longitudinally of the flame a still larger quantity of air can be raised to a temperature that will serve effectively to dry the granulated material slowly and hard.

Figure 7:
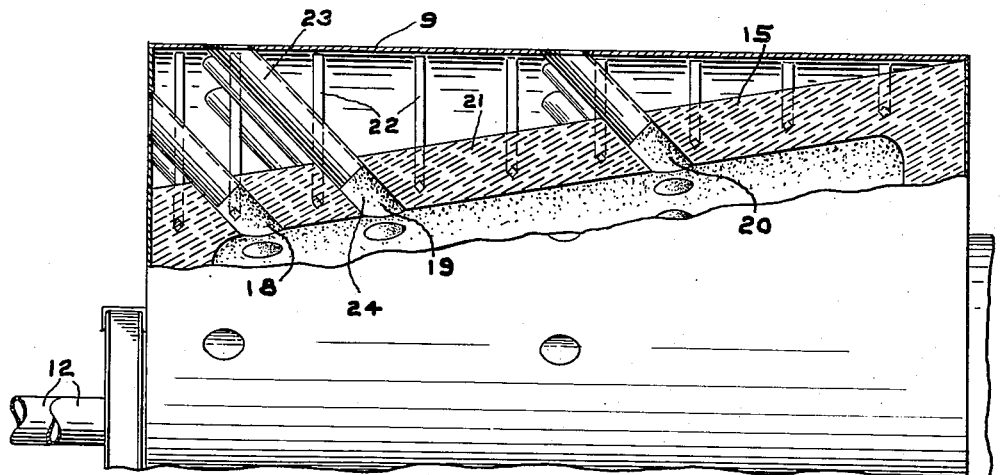
Figure 7 is a fragmentary side elevational view of a modification of the furnace partly broken away.

Because of the parallel relationship of the walls of the refractory in the furnace shown in Figures 2 to 5 inclusive, it is found that there is considerable reflection of the heat from wall to wall in the furnace and a considerable tendency to elevate the temperature of the refractory to an undesirable degree and, of course, that elevation does not correspondingly increase the heat of the incoming air. Because of this radiation it has been found preferable to shape the interior of the refractory material forming the combustion chamber like a truncated cone as shown in Figure 7. It still extends circularly completely around and within the cylindrical wall 9 of the furnace but in this construction the fire brick or refractory 21 is of conical shape in its formation and it is supported from hangers 22 welded from the sides of the cylindrical furnace wall. In this modification tubes 23 are likewise welded to the furnace wall and direct the air into the directional passages 24 through the refractory. Also in this modification it has been found desirable to place the group of tuyeres nearest the furnace back with their inlet ends in the end of the furnace.

In the modification shown in Figures 8 to 11 the tubes 23 of Figure 7 have been omitted but the passages 25 in the refractory while still being directed to focus the incoming air axially of the furnace, are positioned at their inlet ends to draw the air through the metallic furnace wall 26 through openings 27 and at substantially a right angle to that furnace wall. The air coming in through the metallic furnace wall in this direction tends to strike the refractory and to cool it first before its entry through the passages in the refractory to the combustion chamber of the furnace. Here too, the refractory material is supported on hangers 22.

Another modification is shown in Figures 12 to 15 inclusive in which the metallic chamber 28 for the furnace is likewise conical thus avoiding the use of long hangers as in the two modifications previously described for the conical shape of the combustion chamber.

The conical shape of the combustion chamber avoids the absorption of the same quantity of heat by the refractory material because the heat strikes the walls at more of an angle longitudinally and consequently more of the heat is transferred to the incoming air to serve its useful purpose of drying the granular material.

It is preferred that the final set of tuyeres direct the incoming air really beyond the furnace chamber as that air passes from the combustion chamber through the passage chamber to the dryer in all the modifications, this is the row of tuyeres nearest the dryer, this positioning of the focus point also substantially prevents the hot flame itself from entering the dryer to too rapidly heat the granular material and so insures a greater retention of the volatiles in the granules.

The end wall of the combustion chamber, with the central opening therein guides the heated air into the passage chamber, which is closed except for the material inlet chute, and through that chamber to the side of the dryer; the air is directed to the side of the dryer because of the offset between the furnace and dryer. This offset and end furnace wall keeps the chute nearly out of the path of the incoming hot air and greatly prolongs the life of the chute. Through the passage chamber door 29, a workman can enter for repairs or replacements of adjacent parts.

Several modifications for the construction of the furnace chamber being shown, it will be apparent that further modifications may be made not only in the furnace but in other features of the construction without departing from the invention.

What is claimed is new and is desired to be secured by Letters Patent is:

1. In a substantially cylindrical rotary dryer with inlet and outlet ends for fertilizer and other material having flights therein to raise the material to near the top of the dryer and drop it therefrom upon the rotation of the dryer, the fall of material being concentrated at the side of the dryer vertical center where raised and dropped by the flights and having in line therewith a furnace with a fuel inlet end and an opposed restricted heat outlet end centrally of the furnace, a chamber between the dryer and furnace relative to which the dryer rotates and having a restricted passageway therethrough connecting the furnace restricted outlet end substantially adjacent the horizontal diameter of the dryer inlet end, a feed chute passing through the chamber into the side of the dryer end substantially laterally removed from the outlet of said furnace restricted outlet end, the material being introduced to the dryer through the chute, the dryer being sloped downwardly from the inlet end thereof to progress the material therethrough upon the rotation of the dryer, the furnace admitting into the dryer a large volume of heated air without excessive heat to dry the raised and dropped material and comprising means to admit fluid fuel to the furnace and to project the flame thereof toward the furnace restricted outlet end and the dryer inlet end, the furnace having a plurality of groups of orifices in the walls thereof, each group being spaced from the other in the direction of the flame path and the orifices of each group being spaced peripherally around the furnace to admit air in large volume thereinto, means to direct air from the orifices centrally of the furnace and into the path of the flame at separate points along said path spaced toward the dryer from the fuel admitting means of the furnace, to heat the air and assure the continued connection of the flame with the fuel, the center of the furnace restricted outlet end and the path of the flame therefrom being laterally offset from the dryer inlet end toward the side of the dryer dropping the material downwardly from near the top of the dryer upon the rotation of the dryer and vertically in line with the center of concentration of the material fall, whereby the dropped material receives the full flow of the heat from the furnace and the outer surface of the particles of the material is substantially dried during the early stages of the material progress through the dryer, the material feed chute entering the dryer adjacent the dryer side opposite the offset of the furnace outlet end and means at the dryer outlet end to draw air in large volume through the furnace and its orifices and through the dryer.

2. The dryer of claim 1 in which the furnace has refractory walls having said orifices therein which are directed through the refractory walls to constitute said air directing means.

3. In a substantially cylindrical rotary dryer with inlet and outlet ends for fertilizer and other material having means mounted on the inside of the wall thereof to raise the material to near the top of the dryer and drop it therefrom upon the rotation of the dryer, the fall of the material being concentrated at the side of the dryer vertical center where raised and dropped by the wall mounted means and having in line therewith a furnace with a fuel inlet end and an opposed restricted heat outlet end centrally of the furnace, a chamber between the dryer and furnace relative to which the dryer rotates and having a restricted passageway therethrough, restricted relative to the adjacent openings of the furnace and dryer and connecting the furnace outlet end substantially adjacent the horizontal diameter of the dryer inlet end, a feed chute passing through the chamber into the side of the dryer end substantially laterally removed from the outlet of said furnace restricted outlet end, the material being introduced to the dryer through the chute, the dryer being sloped downwardly from the inlet end thereof to progress the material therethrough upon the rotation of the dryer, means to admit fluid fuel to the furnace and to project the flame thereof toward the furnace restricted outlet end and the dryer inlet end, the dryer inlet end being laterally offset from the restricted opening of the center of the furnace outlet end toward the side of the dryer dropping material downwardly upon the rotation of the dryer and vertically in line with the center of concentration of the material fall, the full flow of heat from the furnace striking the dropped material when falling from near the top of the dryer to substantially dry the outer surface of the particles of the material during the early stages of the progress of the material through the dryer, the material feed chute entering the dryer adjacent the dryer side opposite the offset of the furnace outlet end.

References Cited in the file of this patent

UNITED STATES PATENTS

| | | |
|---|---|---|
| 1,513,828 | Kernohan et al. | Nov. 4, 1924 |
| 1,654,358 | Ash et al. | Dec. 27, 1927 |
| 1,703,635 | Ranson | Feb. 26, 1929 |
| 1,916,569 | Haller | July 4, 1933 |
| 2,082,870 | Caffrey | June 8, 1937 |
| 2,165,128 | Cheesman | July 4, 1939 |
| 2,229,383 | Lohse | Jan. 21, 1941 |
| 2,447,482 | Arnold | Aug. 24, 1948 |

FOREIGN PATENTS

| | | |
|---|---|---|
| 948,774 | France | Feb. 7, 1949 |